United States Patent [19]

Kawaziri et al.

[11] 4,296,422

[45] Oct. 20, 1981

[54] IMAGE RECORDING MATERIAL AND IMAGE RECORDING METHOD USING THE SAME

[75] Inventors: Kazuhiro Kawaziri; Masato Fujiwara; Isamu Hatanaka; Masatoshi Tabei; Akio Higashi; Mitsuharu Nirasawa, all of Asaka, Japan

[73] Assignee: Fuji Photo Film Co., Ltd., Kanagawa, Japan

[21] Appl. No.: 6,022

[22] Filed: Jan. 24, 1979

[30] Foreign Application Priority Data

Feb. 8, 1978 [JP] Japan .................................. 53-13300

[51] Int. Cl.³ ........................ G01D 15/14; G03G 15/00

[52] U.S. Cl. .................................... 346/160; 355/3 R

[58] Field of Search ............... 346/160, 153; 355/3 R, 355/3 P

[56] References Cited

U.S. PATENT DOCUMENTS

| | | | |
|---|---|---|---|
| 3,138,547 | 6/1964 | Clark | 346/165 |
| 3,322,539 | 5/1967 | Redington | 346/160 |
| 3,341,856 | 9/1967 | Bigelow | 346/160 |
| 3,425,916 | 2/1969 | Tokumoto et al. | 204/18 PC |
| 3,653,064 | 3/1972 | Inoue | 346/160 |
| 3,776,627 | 12/1973 | Ohnishi | 346/160 |

*Primary Examiner*—Daryl W. Cook
*Attorney, Agent, or Firm*—Gerald J. Ferguson, Jr.; Joseph J. Baker

[57] ABSTRACT

An image is recorded on the recording layer of an image recording material by exposing the photoconductor thereof to imagewise light and applying a voltage there-across. The image recording material is composed of (a) a recording medium consisting of a support base at least one surface of which is electrically conductive and a recording layer provided on the electrically conductive surface of the support base containing an oxidizable or reducible compound, and (b) a photoconductor disposed in contact with the surface of the recording layer.

The photoconductor has a specific resistance of not more than $10^9$ Ωcm and causes the effect of electric rectification at the boundary between itself and the recording layer.

13 Claims, 6 Drawing Figures

IMAGE RECORDING MATERIAL AND IMAGE RECORDING METHOD USING THE SAME

BACKGROUND OF THE INVENTION

1. Field of the Invention

This invention generally relates to an image recording system, and more particularly to an image recording material employing a combination of a recording medium and a photoconductor and to an image recording method using the same.

2. Description of the Prior Art

It has been known in the art to record an image on a specific recording medium by use of an electric current passing through the medium from a photoconductor. A variety of such image recording methods have heretofore been invented.

For example, one of such image recording methods is disclosed in U.S. Pat. No. 3,138,547. In the method of this patent, an electrosensitive recording layer which is non-photosensitive is electrically reduced. That is, a dry electrosensitive recording layer comprising a specific metal compound is reduced by an electric current, whereby an image is recorded thereon.

U.S. Pat. No. 3,425,916 discloses an improved method of the method of the above U.S. Pat. No. 3,138,547. In the method of this patent, nuclei constituting a latent image which is capable of being physically developed into a visible image are formed in a recording layer by a relatively small amount of current flow passing through the recording layer from a photoconductor, and then the recording layer containing the nuclei is processed by a developing solution. Thus, the latent image obtained by use of the current flow is developed into a visible image by a physical method.

It is most desirable that the latent image be formed on the recording layer by a relatively small amount of current flowing therethrough in an imagewise pattern, and then the latent image obtained be developed into a visible image by means of a dry process. Such a method is disclosed in Japanese Patent Public Disclosure No. 63,621/1976. In the method of this invention, a latent image is formed on a recording layer comprising a reducible metal compound such as an organic silver, a reducing agent and a binder by use of a current passing through the recording layer in an imagewise pattern, and the the recording layer is uniformly heated. Thus, the latent image is developed into a visible image.

However, since the above-mentioned recording layer is substantially an insulator, the method disclosed in Japanese Patent Public Disclosure No. 63,621/1976 has a defect in that a high voltage of several kilovolts must be impressed to cause a current to pass through the recording layer. In particular, when a photosensitive medium to be developed by heat is used as a recording medium, an even higher voltage is required to cause the current to pass through the support base thereof as well.

Japanese Patent Public Disclosure No. 23,635/1978 discloses a recording medium and a recording method using the same which eliminate the above-mentioned defect. The recording medium of this patent is composed of a support base at least one surface of which is electrically conductive and a recording layer provided on the electrically conductive surface of the support base containing at least one compound selected from the group consisting of benzotriazole and derivatives thereof in addition to the components which constitute the recording layer disclosed in said Japanese Patent Public Disclosure No. 63,621/1976. A latent image is formed on the recording layer of the recording medium by use of a current passing through the recording layer, and then the recording layer is heated to develop the latent image into a visible image. The recording medium has an advantage in that a latent image can be formed on the recording layer thereof by a relatively low voltage, and the latent image can be devloped into a visible image only by heating the recording layer.

SUMMARY OF THE INVENTION

An object of this invention is to provide a novel image recording material of the type comprising a photoconductor and a recording medium.

Another object of this invention is to provide an image recording material of this type which provides an image of high resolution.

Still another object of this invention is to provide an image recording material of this type having high conductivity and accordingly high sensitivity.

A further object of this invention is to provide a novel image recording method using the novel image recording material.

The inventors of this invention carried out research to achieve the above objects. As a result of their investigations, they found that an image of high resolution can be obtained by use of an image recording material comprising (a) a recording medium which is composed of a support base at least one surface of which is electrically conductive and a recording layer provided on the electrically conductive surface of the support base containing an oxidizable or reducible compound, and (b) a photocoductor disposed in contact with the surface of the recording layer of the recording medium and having a specific resistance of not more than $10^9$ Ωcm and causing the boundary between itself and the recording layer to have an effect of electric rectification when the photoconductor is exposed to imagewise light while a voltage of reverse bias is impressed between the support base of the recording medium and the photoconductor.

The electrical conductivity of the image recording material is high because the electrical resistance of the photoconductor which constitutes one part of the image recording material is small. Accordingly an image can be recorded thereon by use of a low voltage.

That is, the image recording material of this invention is composed of (a) a recording medium comprising a support base at least one surface of which is electrically conductive and a recording layer provided on the electrically conductive surface of the support base containing an oxidizable or reducible compound, and (b) a photocoductor which has a specific resistance of not more than $10^9$ Ωcm and causes the boundary between itself and the recording layer of the recording medium to have an effect of electric rectification when the photoconductor is in contact with the surface of the recording layer.

The image recording method of this invention is composed of exposing to imagewise light a photoconductor of an image recording material which comprises (a) a recording medium comprising a support base at least one surface of which is electrically conductive and a recording layer provided on the electrically conductive surface of the support base containing an oxidizable or reducible compound, and (b) a photoconductor disposed in contact with the surface of the recording layer of the recording medium and having a specific resistance of not more than $10^9$ Ωcm and causing the boundary between itself and the recording layer to have an effect of electric rectification while a voltage of reverse bias is impressed between the support base of the recording medium and the photoconductor.

Experimental results on which the present invention is based will be described hereinbelow.

An n-type GaAs crystal wafer having a specific resistance of 0.3 Ωcm provided with an ohmic electrode on one portion thereof was used as a photoconductor, and the recording medium disclosed in the above-mentioned Japanese Patent Public Disclosure No. 23,635/1978 was used as a recording medium. The surface of the wafer was in close contact with the surface of the recording layer of the recording medium. Then, the voltage-current characteristic (V-I characteristic) of the image recording material obtained was investigated. The investigation revealed that when a bias voltage was impressed on the recording material with the positive potential on the photoconductor side and the negative potential on the recording medium side, the dark current was markedly controlled and an electric rectification effect was clearly observed, whereas when a bias voltage was impressed in the opposite direction the dark current increased enormously. The bias voltage which does not control dark current is referred to as "forward bias", and the bias voltage which controls dark current is referred to as "reverse bias".

The most important point was that when the photoconductor was exposed to light while a reverse bias was impressed between the recording medium and the photoconductor, a great amount of photocurrent was observed, whereas, when a forward bias was impressed, almost no photocurrent was observed and the amount of current observed was almost the same as that of the dark current. The above-mentioned fact regarding the impression of the reverse bias implies that current selectively passes through the recording layer only at exposed portions of the photoconductor, and almost no current passes through the recording layer at unexposed portions thereof, and accordingly, an image having a high signal-to-noise (SN) ratio can be recorded on the recording layer Actually, when the photoconductor of the recording material was exposed to light with a reverse bias and subsequently the recording medium of the recording material was heated for development, a visible image having a high SN ratio wherein exposed portions were seletively darkened and unexposed portions were free of fog was formed on the recording layer of the recording medium. On the other hand, when the recording material was similarly processed with a forward bias instead of the reverse bias, the recording layer was entirely darkened, and accordingly, a visible image was not formed thereon.

The above-mentioned experimental result was unexpected and surprising, because it was expected that due to the small specific resistance of the photoconductor, the current would extend in the lateral direction of the photoconductor and, accordingly, would not be able to pass through the recording layer in the fomr of an image pattern.

Although the reason for the above-mentioned phenomenon is not clarified yet, it is presumed that an electric barrier is formed at the boundary between the photoconductor and the recording layer which are in close contact with each other, and that the electric barrier has the effect of allowing photocurrent to pass only through exposed portions.

In general, the distribution of charges is not uniform at the surface of a semicondcutor which is in contact with a redox material. When the surface of the semiconductor has the non-uniform distribution of charges, a depletion layer is formed at the surface of the semiconductor. (These phenomena are described in detail in the literature titled "Electrochemistry of Boundry Regious from the Molecular Viewpoint" in the publication of "KAGAKUSOSETSU", No. 7, 1975 edited by Japan Chemistry Society). Inside the depletion layer formed along the surface of the semiconductor, there exists an electric field which is perpendicular to the surface of the semiconductor. It is presumed that the perpendicular electric field plays an important role in forming a photocurrent pattern upon the irradiation with light. That is, in the image recording material of the present invention, when the boundary between the photoconductor and the recording medium is exposed to light under the impression of the reverse bias, the photoconductor absorbs the light, and photocarriers appear in the photoconductor. It is presumed that the photocarriers extends little or not all in the lateral direction of the photoconductor, but flow in the perpendicular direction of the photoconductor, because the electric field is perpendicular to the surface of the photoconductor, and that, as a result, a current flows into the recording layer which is composed of a redox material only in the exposed portions of the photoconductor.

Further, a similar experiment was conducted by using n-type CdS instead of the n-type GaAs used in the abovementioned experiment. In this experiment as well, an electric rectification effect was observed in the investigation of the V-I characteristic, and thus, it was confirmed that an electric barrier was formed at the boundary between the photoconductor and the recording layer. In the combination of the n-type CdS photoconductor and the above-mentioned recording medium, forward bias is attained by impressing then-type Cd/S with negative potential and the recording layer with positive potential.

When the reverse bias is made to exceed a certain value, the current sharply rises. The voltage at which the current starts to rise is referred to as "Vr·th". When the n-type CdS which was in close contact with the recording layer was exposed to light while a reverse bias lower than but close to Vr·th was impressed between the n-type CdS and the recording layer, the photocurrent increased as a function of the impression time. Further, surprisingly, when the n-type CdS was exposed to a light pulse, and the impression of the voltage was continued after the exposure, the amount of photocurrent did not decrease, but increased. The phenomenon was constantly observed during the impression of the voltage. This phenomenon is a very desirable phenomenon for image recording, and, by utilizing this phenomenon, the amount of the current passing through the recording layer can be markedly increased up to as much as about a hundred times, sometimes up to $10^4$ to $10^5$ times as large as that obtained by impressing a reverse bias only during the exposure to light. Actually, in the image recording process employing the above-mentioned image recording material, it was found that the resulting sensitivity in the image recording process utilizing the photocurrent obtained during and after the exposure is about a hundred times as high as that of the image recording process utilizing only the photocurrent obtained during the exposure. The above-mentioned phenomenon is referred to as the "photoswitching effect". Although the mechanism which led to the result obtained in the experiment is not clearly understood, the result itself is a very desirable one in the recording of images.

DETAILED DESCRIPTION OF THE INVENTION

Figure 1:
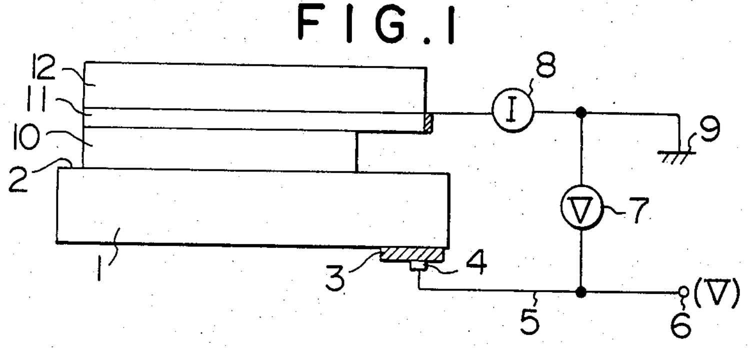
FIGS. 1, 2 and 4 are schematic cross-sectional views showing a method for measuring the V-I characteristic of an image recording material in accordance with an embodiment of the present invention.

The present invention will be described in detail hereinbelow.

Photoconductors which can be employed in the image recording material of this invention are those which exhibit photoconductivity when an electromagnetic wave having a wavelength shorter than 20 $\mu m$ impinges thereon. Further, the photoconductor should act as an electric rectifier when a recording medium is in close contact therewith and should have a small specific resistance. Whether a photoconductor exhibits the property of electric rectification or not can be confirmed by the following experiment.

A recording medium having a recording layer which contains an oxidizable or reducible compound is selected. Then, the photoconductor to be tested is put into close contact with the surface of the recording layer, and the V-I characteristic of the recording material obtained is measured. If electric rectification is observed between the photoconductor and the recording medium, the photoconductor can be employed in the present invention in combination with the recording medium. An electric barrier may appear between a photoconductor and the recording layer of a recording medium depending upon the combination of the photoconductor and the recording medium. Accordingly, even if the photoconductor does not exhibit electric rectification property when combined with a certain recording medium, the photoconductor may be employed in the present invention if it exhibits this property when combined with another recording medium.

The preferred specific resistance of the photoconductor employed in the present invention is generally not more than $10^9$ Ωcm though the preferred value varies with the voltage used. It is more preferably not more than $10^8$ Ωcm, which falls in the region of electrically conductivity, and even more preferably not more than $10^7$ Ωcm. Photoconductors with specific resistances within this preferred range can be found among simple-substance photoconductor and, moreover, among n-type and P-type photoconductors in which a majority of the carriers (electrons or holes) are formed by a donor type or acceptor type impurity atom or by a lattice defect. For example, ZnO as a simple substance cannot be used in the present invention since the specific resistance thereof is $10^{10}$ Ωcm or more. However, ZnO doped with a donor type impurity atom such as H, Li or Zn can be used since the specific resistance thereof is not more than $10^9$ Ωcm. On the other hand, CdS doped with over a predetermined amount of Cu cannot be used since the specific resistance thereof rises to more than $10^9$ Ωcm.

Photoconductors which can be used in the present invention include Si, Ge, ZnS, ZnSe, ZnTe, CdS, CdSe, CdTe, GaP, GaAs, $Ga_xAl_{1-x}As$, GaSb, InP, InAs, InSb, PbS, PbSe, PbTe, SiC, AlSb, HgTe, BP, AlP, HgSe, ZnO, $TiO_2$, CuO, PbO, $CdS_xSe_{1-x}$, $CdS_xTe_{1-x}$, $Zn_xCd_{1-x}S$, $Zn_xCd_{1-x}Se$, and the like. These photoconductors may be used in the form of a simple substance if the specific resistance of the simple substance is not more than $10^9$ Ωcm, or may be used in the form of an n-type or P-type photoconductor having a specific resistance of not more than $10^9$ Ωcm which is obtained by doping the simple substance with a donor type or acceptor type impurity atom. Obviously, photoconductors other than the above photoconductors can be employed if the specific resistance thereof is not more than $10^9$ Ωcm.

One of the advantages of this invention is the occurrence of a photoswitching effect and whether this effect occurs can be confirmed by the following experiment. A photoconductor brought into close contact with a recording medium is exposed to light while a reverse bias is impressed between the photoconductor and the recording medium. Then, with the continued impression of the voltage the change in current is observed. In this experiment, if the photocurrent remains constant or gradually increases after exposure of the recording medium to light, the photoconductor can be used to obtain a photoswitching effect. Among such photoconductors are included n-CdS, n-CdSe, n-$CdS_{1-x}Se_x$, n-$CdS_{1-x}Te_x$, $CdSe_{1-x}Te_x$, $Zn_xCd_{1-x}S$, $CdS_xO_{1-x}$, and the like.

The above photoconductors may be provided on the surface thereof with a film of insulator such as $SiO_2$, SiO, $Si_3N_4$, $Al_2O_3$ and the like or of semiconductor such as $WO_3$, $MoO_3$ and the like having a thickness of several tens to several hundreds angstroms.

The resistance of the recording layer of the recording medium employed in the present invention is required to be such that at least some current can pass therethrough. That is, the recording layer of the recording medium employed in the present invention is required to have a specific resistance of not more than $10^{11}$ Ωcm. The specific resistance of the recording layer is preferably not more than $10^8$ Ωcm, and more preferably not more than $10^6$ Ωcm. Although such recording mediums can be found among those which undergo a redox reaction proportional to the amount of current passing therethrough, the recording medium employed in the present invention should exhibit electric rectification property when in close contact with at least one of the photoconductors which can be employed in this invention. However, even if the recording medium does not exhibit the property of electric rectification when it is combined with a certain photoconductor, the recording medium can still be employed in the present invention if it exhibits electric rectification property when it is combined with another photoconductor.

The following recording mediums for use are particularly effective in the present invention; a recording medium employing benzotriazole as disclosed in Japanese Patent Public Disclosure No. 23,635/1978; a recording medium employing $Co^{III}$ complex as disclosed in Japanese Patent Public Disclosure No. 37,035/1978; a recording medium having a recording layer comprising a compound such as triphenyltetrazoliumchloride which assumes a color when it is reduced and an electrically conductive binder in which the compound is dispersed; a recording medium employing an electrochromic material such as tungsten trioxide ($WO_3$); and the like.

Each of the above-mentioned media will be described in detail below.

The recording medium disclosed in Japanese Patent Public Disclosure No. 23,635/1978 is composed of an electrically conductive support base and a recording layer provided on the support base comprising a binder, benzotriazole, a reducible metal compound (for example, benzotriazole silver) and a reducing agent. A latent image is formed on the recording layer by use of an imagewise current passing through the recording layer, and then the recording layer is heated to develop the latent image into a visible image.

The recording medium disclosed in Japanese Patent Public Disclosure No. 37,035/1978 is composed of an electrically conductive support base and a recording layer provided on the support base comprising a binder and a $CO^{III}$ complex (for example, hexaamminecobalt-(III) trifluoroacetate). A latent image is formed on the recording layer by use of an imagewise current passing through the recording layer, and then the recording layer is heated. Thus, the latent image is developed into a visible image.

Recording mediums employing a compound which assumes a color when it is reduced (for example, triphenyltetrazoliumchloride) are composed of an electrically conductive support base and a recording layer provided on the support base comprising an electrically conductive binder and the compound dispersed in the binder. A visible image is formed in the recording layer by use of an imagewise current passing through the recording layer. The compound used in this recording medium is discribed in, for example, Japanese Patent Publication No. 31,456/1975. As the electrically conductive binder, ECR-34 (electrically conductive binder which is commercially available from Dow Chemical Company), a highmolecular electrolyte, a binder in which benzotriazole is dispersed to impart electroconductivity to the binder, and the like may be used.

Recording mediums wherein an electrochromic material is used are composed of an electrically conductive support base and a recording layer provided on the support base comprising an electrochromic material (for example, tungsten trioxide) and a binder. A visible image is formed in the recording layer by use of an imagewise current passing through the recording layer. The electrochromic material used in this recording medium is described in, for example, British Pat. No. 1,186,541.

In the above-mentioned recording media, a visible image is formed in a recording layer either by only passing a current through the recording layer or by the current and subsequent application of heat. That is, the above-mentioned recording media are of a type processed by means of a dry process. However, the recording medium employed in the present invention is not limited to type, and a recording medium wherein a latent image is formed in a recording layer by a current passing therethrough, and then the latent image is physically developed (wet process) into a visible image by means of a developing solution can also be employed in the present invention. For example, such a recording medium processed by a wet process is disclosed in U.S. Pat. No. 3,425,916.

Further, a recording medium having a conventional photographic emulsion layer can also be employed in the present invention. For example, such a recording medium is disclosed in the literature titled "Investigation in the Field of Image Intensification, Final Report" by K.S. Lion et al. of the U.S. Air Force Cambridge Research Laboratory, pages 64 to 133.

In this invention, a photoconductor may be used as a wafer as it is, or may be provided on an electrically conductive support base. The recording layer of a recording medium should be provided on an electrically conductive support base. As the electrically conductive support base, a support base comprising a base material such as plastic film or glass plate and an electrically conductive film provided on the surface of the base material, a metal plate which is electrically conductive per se, and the like can be used. A sheet of paper can also be conveniently used as the base material since it can be easily processed into a desired shape. Various known materials other than the above-mentioned base materials can also be used as the base material of the support base.

As the electrically conductive film provided on the surface of the base material, a film of a metal such as platinum, gold, silver, palladium, chromium, nickel or aluminum or a film of $In_2O_3$, $SnO_2$ etc. can be used. The metal film is provided on the surface of the base material by laminating a foil of the metal thereon, or by forming a coating of the metal thereon by means of vacuum evaporation, cathodic sputtering, ion plating, electroless plating, etc. $In_2O_3$ or $SnO_2$ film is provided on the surface of a base material such as plastic film or glass plate by forming a coating of In or Sn thereon by means of vacuum evaporation, cathodic sputtering, ion plating, electroless plating, etc., and then oxidizing the coating of In or Sn into a coating of $In_2O_3$ or $SnO_2$, or by applying an aqueous solution of In or Sn salt thereon, drying the solution to obtain a coating of In or Sn salt, and then heating the base material to oxidize the coating of In or Sn salt into a coating of $In_2O_3$ or $SnO_2$. A support base having $In_2O_3$ or $SnO_2$ film is most desirable as a support base of the recording medium of this invention, because these films are transparent and do not become a cause for fog when the recording medium is subjected to an image recording process.

For example, as a commercially available support base, "NESA GLASS" can be employed in the present invention. A base material such as paper can also be used as a support base if an electrically conductive composition is applied thereon as the recording layer since the impregnation of the electrically conductive composition into the paper will make the surface of the paper electrically conductive.

In the image recording material of the present invention, an imagewise current is caused to pass through the recording layer of the recording medium by bringing the photoconductor into contact with the recording layer of the recording medium, and then, exposing the photoconductor to imagewise light while a reverse bias is impressed between the support base of the recording medium and the photoconductor.

The recording medium and the photoconductor of the image recording material can be integrally combined or separate. Of course, in the latter case, the recording medium and the photoconductor are put into close contact with each other when the imagewise current is caused to pass through the recording layer of the recording medium. In either case, an imagewise electromagnetic wave capable of producing a photoconductive effect in the photoconductor is caused to impinge upon the photoconductor with the photoconductor in close contact with the recording layer. This exposure to the imagewise electromagnetic wave is conducted in the dark and may be from either side of the image recording material. Simultaneously, a reverse bias is impressed between the recording medium and the photoconductor, and thus, the necessary amount of the imagewise current is caused to pass through the recording layer.

The amount of current necessary to form an image is determined by the kind of recording medium employed. When a heat developing process or a wet developing process is to be conducted after the passage of the current, the current must be passed through the recording layer in an amount sufficient to produce a latent image of a density high enough to allow formation of a visible image when the latent image is subjected to whichever of these developing processes is to be used. When a visible image is directly formed by means of the current flow, it is necessary to cause the current to pass through the recording layer until a sufficient optical density is obtained.

When an image is formed on a recording layer by causing a current to pass through the recording layer, it is obvious that the lower the electric resistance of the photoconductor is, the larger amount of current passing through the recording layer will be. In general, this means that a photoconductor of lower electric resistance will result in a higher density of image at the same voltage and for the same period of voltage impression. Accordingly, when a photoconductor of low electric resistance is used, the time of voltage impression can be shortened. However, if the electric resistance of the photoconductor is too low, a large amount of dark current flows into unexposed portions thereof, which results in recording of images of extremely lowered SN ratio. In extreme cases, the SN ratio is lowered to such an extent that the whole area of the recording layer appears black.

In view of this problem, in this invention, the photoconductor is put into contact with the recording medium in such a manner that the boundary therebetween has an electric rectification effect, and a reverse bias is impressed between the photoconductor and the recording medium during exposure thereof to imagewise light. By the combined effect of electric rectification and reverse bias, the current is prevented from flowing into the unexposed portions and a sufficient amount of current passes only through the exposed portions. Hence, the SN ratio of the latent image and accordingly of the finally obtained visible image is markedly enhanced.

Then, unless the recording medium is one in which a visible image is directly formed by the imagewise current, the recording medium is processed to develop the latent image recorded thereon into a visible image. Although a known wet process described in the above-mentioned U.S. Pat. No. 3,425,916 can be employed, it is most desirable to employ a heat developing process.

The heating is conducted simultaneously with or subsequent to the above-mentioned recording of the latent image. The heating is performed by putting the recording medium into contact with the surface of a heating plate, a heating roller, or the like, or by exposing the recording medium to the radiation emitted by a heating lamp, an ultra high frequency wave generator, an ultrasonic wave generator, or the like. The heating temperature effective to form a desirable visible image is in the range of about 80° to 250° C., preferably about 100° to 160°. The optimum heating temperature is selected from the above range in view of the properties desired of the visible image, the components constituting the recording medium, and so forth. The heating time is in the range of about 0.1 to 120 seconds, preferably about 0.3 to 60 seconds. Similarly, the heating time can be varied within the above range in view of the components constituting the recording medium, the shape of the heating equipment, and so forth.

As described hereinabove, in the present invention, differently from the conventional image recording systems employing a photoconductor and a recording medium, the recording of images is successfully performed by employing a particular combination of a recording medium and a photoconductor having a low specific resistance which causes the boundary between the recording medium and the photoconductor to have an effect of electric rectification, and by impressing a reverse bias between the recording medium and the photoconductor. Further, in the present invention, high-sensitivity recording of images can be performed by employing the photo-switching effect.

The present invention will now be described hereinbelow with reference to several Examples.

EXAMPLE 1

A recording medium was prepared in accordance with the following procedure.

30 grams of benzotriazole were dissolved in 400 ml of butyl acetate, and the solution obtained was cooled to the temperature of −15° C. 42.5 grams of silver nitrate were dissolved in 400 ml of dilute nitric acid of pH 2.0 (25° C.), and the temperature of the solution thus obtained was adjusted to 3° C. Then, the silver nitrate solution prepared was dropped into the above-mentioned cooled solution while being stirred by a stirrer to obtain a dispersion containing microcrystals of benzotriazole silver. The liquid was removed from the dispersion, and the benzotriazole silver obtained was washed twice with 600 ml of water by decantation. Then, 600 ml of methanol were added to the benzotriazole silver washed to obtain a dispersion, and the benzotriazole silver was separated from the dispersion by centrifugalization. The addition of methanol and the separation of the benzotriazole silver were repeated once. The particle size of the benzotriazole silver thus obtained was about 1 μm in major diameter.

Next, all the benzotriazole silver obtained was mixed with 76 grams of benzotriazole and 320 ml of ethanol solution containing 32 grams of polyvinylbutyral, and the mixture was stirred under atmospheric pressure at 250° C. for one hour by means of a homogenizer to prepare a dispersion.

Then, 40 grams of the dispersion obtained were mixed with 8 ml of methylcellosolve solution of 25 wt% ascorbic acid monopalmitate and 1 ml of methylcellosolve solution of 5 wt% 3-mercapto-4-phenyl-1,2,4-triazole at 50° C. to obtain a solution to prepare a recording layer.

The solution obtained was applied on a support base comprising a polyethyleneterephthalate film carrying thereon a vacuum evaporated $In_2O_3$ film and having a thickness of 100 μm and an electric resistance of 1.2 K Ω/cm² to form a recording layer containing 2.0 g of silver per 1 m² of the support base. Then, the recording layer was dried at 70° C. for one hour. Thus, the recording medium was obtained.

An n-type GaAs wafer having an optical surface, a thickness of 100 μm and a specific resistance of 0.5 Ωcm was used as a photoconductor. A Au-Ge alloy was applied to a portion of the back surface (opposite the optical surface) of the wafer by vacuum evaporation, and a lead wire was connected to the alloy by use of silver paste.

As shown in FIG. 1, the recording layer 10 of the recording medium and the optical surface 2 of the n-type GaAs wafer 1 were put into close contact with each other, and a voltage was impressed between the $In_2O_3$ electrode 11 and the lead wire 5 attached to the n-type GaAs wafer 1 to measure the V-I characteristic of the image recording material. In FIG. 1, reference numerals 3, 4, 6, 7, 8, 9 and 12 represent ohmic electrode, silver paste, power source, voltmeter, ammeter, earth and polyethylene-terephthalate film, respectively.

Figure 3:
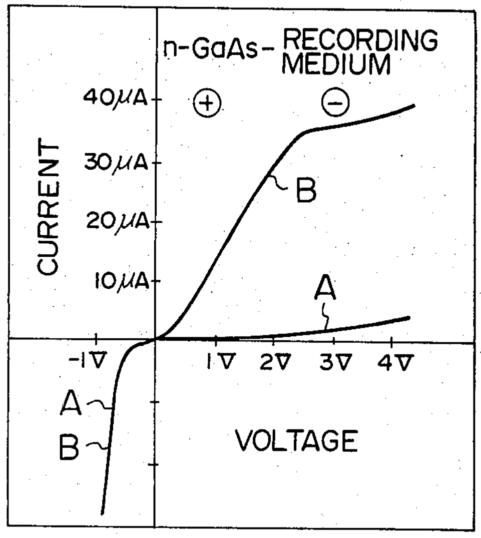
FIGS. 3 and 5 are graphs showing the V-I characteristic of an image recording material in accordance with an embodiment of the present invention.

As the result of the measurement, as shown in FIG. 3, a clear electric rectification effect was observed in which when a positive bias was applied to the n-type GaAs wafer 1 side only a small amount of current flowed across the image recording material (curve-A), whereas when negative bias was applied, a large amount of current flowed therethrough.

Next, the V-I characteristic was measured while a portion 15 of the n-type GaAs wafer 1 was exposed to light 14 from a tungsten lamp of 500 lux passing through an optical mask 13 and the recording medium 10, 11, 12. As shown at curve B in FIG. 3, a photocurrent signal was observed when a positive bias was applied to the n-type GaAs wafer 1 side.

Figure 2:
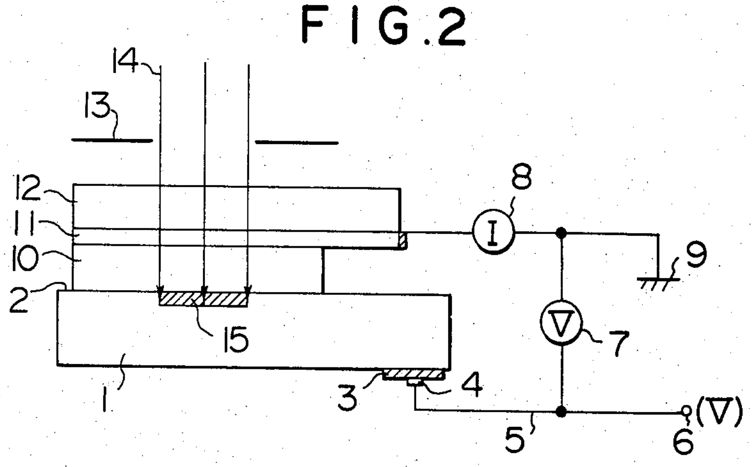

Further, in the condition shown in FIG. 2, the optical surface 2 of the n-type GaAs wafer 1 was exposed to light from a tungsten lamp of 1000 lux passing through a negative image mask (not shown) corresponding to the optical mask 13 and the recording medium 10, 11, 12 for one second with a positive bias of 4 volts impressed on the n-type GaAs wafer 1. After the exposure, the recording medium was peeled off from the n-type GaAs wafer 1 and heated at 130° C. for 30 seconds. A positive image having a continuous gradation was obtained on the recording layer 10 of the recording medium.

EXAMPLE 2

A CdS thin film having a thickness of 5000 Å and a specific resistance of $2\times 7^7$ Ωcm provided on a transparent $In_2O_3$ film disposed on a glass plate having a surface resistance of about 30 Ω/cm² was used as a photoconductor. The CdS thin film was prepared by high-frequency sputtering wherein a CdS target having a purity of 99.999% (commercially available from Material Research Co.) was sputtered on the support base of 250° C., in an argon gas atmosphere containing 20% of $H_2S$ gas and having a gas pressure of $6\times 10^{-3}$ Torr, with a high-frequency density of 5 W/cm² at the target surface, for four minutes. As an ohmic electrode, In was provided on the CdS thin film in an area of 1 cm² by evaporation, and the photoconductivity of the CdS thin film was measured. The resistance of the CdS thin film was 1 K Ωin the dark, and when it was exposed to light having a wavelength of 500 nm at an amount of $8\times 10^{11}$photon $cm^{-2}sec^{-1}$, the resistance thereof was about 100 Ω.

Figure 4:
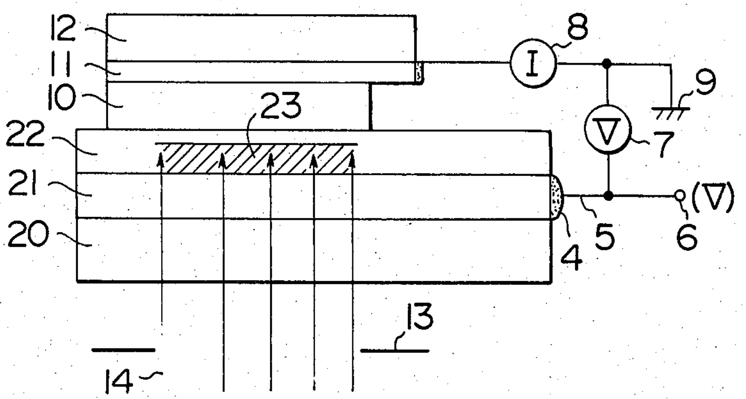

The V-I characteristic was measured in the same manner as described in Example 1 except for using the above-mentioned CdS thin film photoconductor instead of the n-type GaAs wafer. The method for measuring the V-I characteristic is schematically shown in FIG. 4. In FIG. 4, the reference numerals 20, 21, 22 and 23 represent glass plate, transparent $In_2O_3$ film, CdS thin film and exposed portion thereof, respectively.

Figure 5:
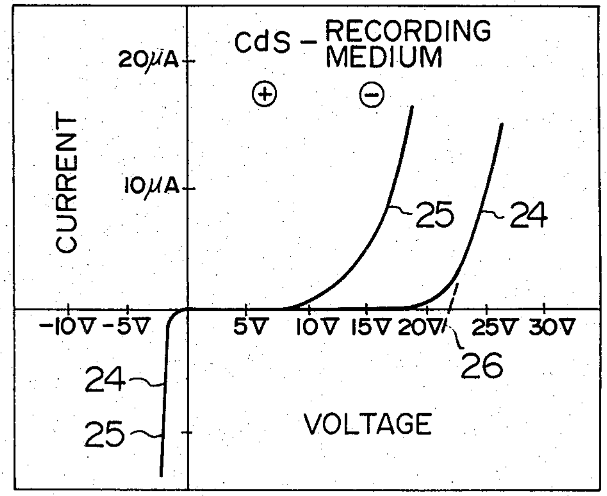

Similarly to Example 1, when a positive bias was impressed on the $In_2O_3$ electrode 21 on which the CdS thin film 22 was provided, the amount of the current measured was not more than several μA/cm², and accordingly, very good electric rectification was observed. When the voltage of the positive bias was further raised, a marked increase of the current was observed when the voltage of the positive bias was raised over about 22 volts (Vr·th) (see curve 24 of FIG. 5). Further, when the V-I characteristic was measured while the CdS thin film 22 was exposed to light 14 of 1 lux from the glass plate 20 side as shown in FIG. 4, a photocurrent signal was observed (see curve 25 of FIG. 5).

EXAMPLE 3

Figure 6:
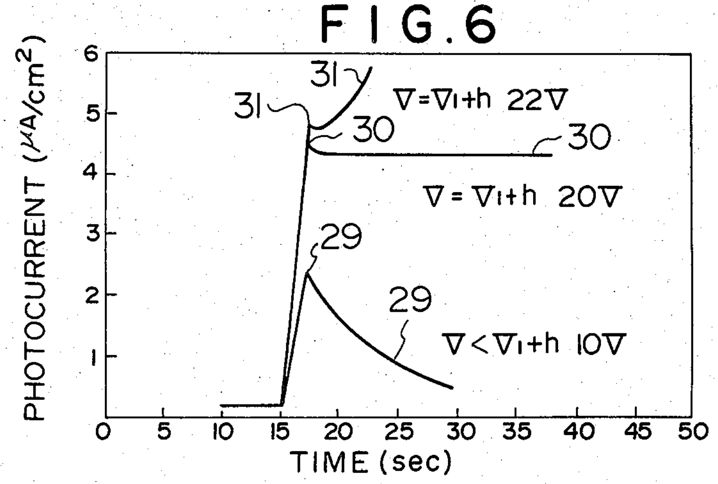
FIG. 6 is a graph showing changes in the amount of a photocurrent flowing through an image recording material in accordance with an embodiment of the present invention.

In the method described in Example 2, positive biases of 10 volts, 20 volts and 22 volts were impressed. In each case, the CdS thin film was exposed to a light pulse of 3 lux·sec from a tungsten lamp, and after the exposure, the change in the photocurrent was measured. The results are shown in FIG. 6. When the positive bias of 10 volts was impressed, the current after the exposure was markedly decreased (see curve 29). However, the rate of decrease fell as the voltage of the positive bias was raised, and when the positive bias of 22 volts was impressed, the current did not decrease, but increased (see curve 31) showing a photo-switching effect.

EXAMPLE 4

In Example 2, a positive bias of 22 volts was impressed on the CdS thin film in the dark, and the CdS thin film was exposed to negative imagewise light from the glass plate side for 1 second by using a light source of a tungsten lamp of 100 lux. After the exposure, the impression of the positive bias was continued for 1 second. Then, the recording medium was peeled off from the CdS thin film and heated at 130° C. for 30 seconds. A positive image having a continuous gradation was obtained on the recording layer of the recording medium.

Further, the photosensitivity was measured by using light of 500 nm and an optical wedge. As a result, it was found that light at an amount of $5\times 10^{12}$photon $cm^{-2}sec^{-1}$ was necessary to obtain a density of fog+0.1.

EXAMPLE 5

In Example 4, when the impression of the positive bias was continued for 30 seconds after the exposure, light at only an amount of $8\times 10^{10}$photon $cm^{-2}sec^{-1}$ was sufficient to obtain a density of fog+0.1. Accordingly, in this case, the recording of images was performed with higher sensitivity than in the case wherein the impression of the positive bias was immediately stopped after the exposure.

EXAMPLE 6

A CdS-CdSe mixed crystal film having a thickness of about 5000 Å provided on a transparent $In_2O_3$ film on a glass plate having a surface resistance of 30 Ω/cm² was used as a photoconductor. The specific resistance of the CdS-CdSe mixed crystal film was about $10^5$ Ωcm. The film was prepared by ion plating as described hereinbelow. That is, in an argon gas atmosphere containing 10 to 20% of $H_2S$ gas and having a gas pressure of about $3\times10^{-3}$ Torr in which electric discharge was caused to occur by a high-frequency wave of 13.5 MHz, CdS and CdSe were deposited on a support base heated to 200° C. by evaporation from separate Knudsen crucibles respectively at the deposition rate of about 100 Å/min. for 25 minutes.

The CdS-CdSe mixed crystal film photoconductor and the recording medium described in Example 1 were put into close contact with each other, and the V-I characteristic was measured in the same manner as described in Example 2. Substantially effective electric rectification was observed. When the CdS-CdSe film side was applied with a positive bias, a bias reverse to the rectification was effected. A phenomenon similar to the photoelectric characteristic as shown in Examples 2 and 3 was also observed. Vr·th was about 15 V and the CdS-CdSe film showed a spectral sensitivity having a peak in the neighborhood of 600 nm which was of a longer wavelength than that of CdS. Further, a positive bias of 15 volts was impressed on the CdS-CdSe film, and the CdS-CdSe film was exposed to negative imagewise light by use of a tungsten lamp. After the exposure, the impression of the positive bias was continued for 30 seconds. Then, the recording medium was peeled off from the CdS-CdSe film and heated at 130° C. for 30 seconds. A clear positive image was obtained on the recording layer of the recording medium. An image density of fog+0.1 was obtained by the light from the tungsten lamp at an amount of 1 lux·sec.

EXAMPLE 7

10 grams of a water solution of 10% gelatin, 1 gram benzotriazole and 0.5 grams of 2, 3, 5-triphenyltetrazoliumchloride were mixed to obtain an emulsion to prepare a recording layer. The emulsion obtained was applied on an $In_2O_3$ film of a support base in a thickness of 4 to 5 μm to form a recording layer. The support base was composed of a polyester film having a thickness of 100 μm and an $In_2O_3$ film having a surface resistance of 1.2 KΩ/cm² provided on the polyester film. The recording layer of the recording medium thus obtained assumed a red color in the density of 0.1 upon the passage of a current of about 500 μc/cm².

The CdS film described in Example 2 was used as a photoconductor.

The recording medium and the CdS film were put into close contact with each other, and the V-I characteristic was measured in the same manner as described in Example 2. The measurement revealed an electric rectification effect similar to that described in Example 2. A photo-electric characteristic similar to that described in Example 2 was also observed. Further, a positive bias of 22 volts was impressed on the CdS film in the dark, and the CdS film was exposed to negative imagewise light from the glass plate side by using light of 500 nm at an amount of 100 lux·sec. After the exposure, the impression of the positive bias was continued for 30 seconds. Then, the recording medium was peeled off from the CdS film. A clear red colored positive image was obtained on the recording layer of the recording medium. An image density of fog+0.1 was obtained by the light of 500 nm at an amount of $4\times10^{12}$ photon $cm^{-2}sec^{-1}$.

EXAMPLE 8

A recording medium was prepared in accordance with the following procedure.

A composition for forming a recording layer was prepared by mixing 6 ml of ethanol solution containing 0.6 grams of polyvinylbutyral (commercial name; DENKABUTYRAL 4000-2), 60 milligrams of $Co(NH_3)_6(CH_3COO)_3$, 18 milligrams of 1-(2-pyrdylazo)2-naphthol and 0.4 grams of dimethylstearamide.

Then, the composition obtained was applied on an $In_2O_3$ film of a support base by means of a wire bar #60 and dried to form a recording layer thereon having a thickness of 8.7 μm. The support base was composed of a polyester film having a thickness of 100 μm and an $In_2O_3$ film provided thereon having a surface resistance of 1.2 K Ω/cm². Thus, a recording medium was obtained.

The recording layer of the recording medium assumed a green color when it was heated after a current was passed therethrough. For example, when the recording layer was heated at 120° C. for 10 seconds after a current of 20 to 30 μc/cm² was passed therethrough, the recording layer assumed a green color in the density of fog+0.1.

Next, the recording medium and the CdS film photoconductor described in Example 2 were put into close contact with each other, and the V-I characteristic was measured in the same manner as described in Example 2. The measurement revealed an electric rectification effect similar to that described in Example 2. A photoelectric characteristic similar to that described in Example 2 was also observed.

Further, a positive bias of 22 volts was impressed on the CdS film in the dark, and the CdS film was exposed to negative imagewise light from the glass plate side by using light of 500 nm at an amount of 100 lux·sec. After the exposure, the impression of the positive bias was continued for 30 seconds. Then, the recording medium was peeled off from the CdS film and heated at 120° C. for 10 seconds. A clear green colored positive image having a continuous gradation was obtained on the recording layer of the recording medium. An image density of fog+0.1 was obtained by light of 500 nm at an amount of about $5\times10^{11}$ photon $cm^{-2}sec^{-1}$.

We claim:

1. An image recording material comprising in combination (a) a recording medium comprising a support base at least one surface of which is electrically conductive and a recording layer provided on the electrically conductive surface of said support base containing an oxidizable or reducible compound, and (b) a photoconductor which has a specific resistance of not more than $10^9$ Ωcm and which causes the boundary between itself and said recording layer to have an effect of electric rectification when said photoconductor is in contact with a surface of said recording layer.

2. An image recording material as defined in claim 1 wherein said specific resistance of said photoconductor is not more than $10^8$ Ωcm.

3. An image recording material as defined in claim 2 wherein said specific resistance of said photoconductor is not more than $10^7$ Ωcm.

4. An image recording material as defined in claim 1 wherein a specific resistance of said recording layer is not more than $10^{11}$ Ωcm.

5. An image recording material as defined in claim 4 wherein said specific resistance of said recording layer is not more than $10^8$ Ωcm.

6. An image recording material as defined in claim 5 wherein said specific resistance of said recording layer is not more than $10^6$ Ωcm.

7. A method of recording an image on an image recording member comprising (a) a recording medium including a support base, at least one surface of which is electrically conductive and a recording layer provided on the electrically conductive surface of said support base containing an oxidizable or reducible compound, and (b) a photoconductor disposed in contact with a surface of said recording layer of said recording medium, said photoconductor having a specific resistance of not more than $10^9$ Ωcm, where the boundary between the photoconductor and the recording layer is electrically rectifying, said method comprising the steps of applying a reverse bias voltage across the said boundary and imagewise exposing the photoconductor while said bias voltage is being applied to the boundary.

8. A method as in claim 7 where the photoconductor has a threshold voltage (Vr·th) approximately at which the electrical rectification of the boundary is substantially lessened as the reverse bias voltage is increased, said method including the steps of setting said bias voltage to a value about equal to Vr·th, imagewise exposing the photoconductor for a predetermined period of time and maintaining the application of the bias voltage for a predetermined period of time after the imagewise exposure of the photoconductor has terminated.

9. An image recording method as defined in claims 7 or 8 wherein said specific resistance of said photoconductor is not more than $10^8$ Ωcm.

10. An image recording method as defined in claim 8 wherein said specific resistance of said photoconductor is not more than $10^7$ Ωcm.

11. An image recording method as defined in claims 7 or 8 wherein a specific resistance of said recording layer is not more than $10^{11}$ Ωcm.

12. An image recording method as defined in claim 11 wherein said specific resistance of said recording layer is not more than $10^8$ Ωcm.

13. An image recording method as defined in claim 12 wherein said specific resistance of said recording layer is not more than $10^6$ Ωcm.

* * * * *